United States Patent [19]
Domeki et al.

[11] Patent Number: 5,194,796
[45] Date of Patent: Mar. 16, 1993

[54] MICRO-STEP DRIVE SYSTEM OF A FIVE-PHASE STEPPING MOTOR

[75] Inventors: Hideo Domeki; Hirofumi Nagasawa, both of Kashiwa, Japan

[73] Assignee: Oriental Motor Kabushiki Kaisha, Tokyo, Japan

[21] Appl. No.: 549,296

[22] Filed: Jul. 6, 1990

[30] Foreign Application Priority Data

Sep. 4, 1989 [JP] Japan ............... 1-228676
Sep. 13, 1989 [JP] Japan ............... 1-237719

[51] Int. Cl.$^5$ ............................................. H02P 8/00
[52] U.S. Cl. ................................. 318/696; 318/685
[58] Field of Search .......................... 318/696, 685

[56] References Cited

U.S. PATENT DOCUMENTS

| | | | |
|---|---|---|---|
| 3,842,332 | 10/1974 | Heine et al. | 318/696 |
| 4,603,287 | 7/1986 | Setoya | 318/696 |
| 4,607,104 | 8/1986 | Setoya | 318/696 |
| 4,663,577 | 5/1987 | Satomi | 318/696 |
| 4,739,239 | 4/1988 | Krause | 318/685 |
| 4,755,732 | 7/1988 | Ando | 318/696 |
| 4,799,002 | 1/1989 | Matsumoto | 318/696 |
| 4,835,451 | 5/1989 | Schnebel et al. | 318/696 |
| 4,888,542 | 12/1989 | Muranaka | 318/696 |
| 4,956,595 | 9/1990 | Hirofumi et al. | 318/696 |

Primary Examiner—William M. Shoop, Jr.
Attorney, Agent, or Firm—Stanger, Stempler & Dreyfus

[57] ABSTRACT

A micro-step drive system of a five-phase stepping motor is disclosed. When Io is a constant, a unit time interval is 1, a remainder obtained by a time variable divided by 10 is t and an arbitrary constant is $\alpha$ ($0 \leq \alpha < 10$), each of five-phase windings for a salient-pole corresponding to a k-th phase (k=0, 1, 2, 3 and 4) is supplied with a current $I_k$. This winding current is obtained by pulse width modulating an output of a constant current converter by an output signal of a pulse width modulation pattern generator and supplying the modulated current to each of the windings as an output of an inverter. A power circuit of the inverter is simplified greatly.

8 Claims, 8 Drawing Sheets

MICRO-STEP DRIVE SYSTEM OF A FIVE-PHASE STEPPING MOTOR

FIELD OF THE INVENTION AND RELATED ART STATEMENT

The present invention relates to a micro-step drive system of a five-phase stepping motor in which one step angle is subdivided.

A stepping motor is generally operated in a basis step angle or a half thereof, while the step angle can be subdivided by controlling a winding current.

A current waveform for driving the stepping motor is not square-wave but sine-wave or trapezoid or triangle-wave. Heretofore, there is a drive method named a so-called micro-step drive method in which the drive current of the stepping motor having such a waveform is controlled to subdivide the basis step angle. In the five-phase stepping motor, the current waveform for each phase is controlled, for example, in the trapezoidal waveform as shown in FIG. 14 to subdivide the torque vector.

Figure 14:
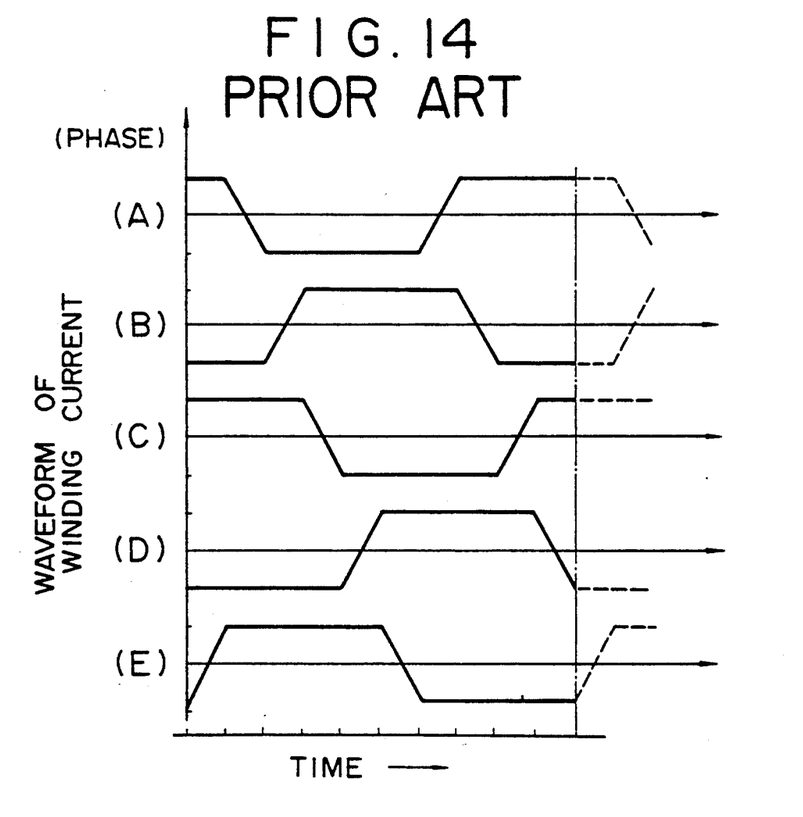
FIG. 14 is a timing chart showing currents flowing through each of windings by a conventional micro-step drive circuit in time.

However, in this drive method, it is necessary to control each of the phase currents independently because of unbalanced current as apparent from FIG. 14.

Further, in the five-phase stepping motor, five full-bridge circuit are required. A current control chopper is provided in the preceding stage of the bridge circuit in order to control the current.

Four switching elements for each phase and an independent current control circuit for each phase are required. Accordingly, the circuit configuration is complicated and a circuit cost is increased due to a large size of an apparatus. Further, adjustment for control the current for each phase is complicated.

OBJECT AND SUMMARY OF THE INVENTION

Accordingly, it is an object of the present invention to solve the above problems and provide a micro-step drive system of a five-phase stepping motor in which structure is simplified to attain compactness.

In order to achieve the above object, the present invention is configured as described below in (1) and (2).

(1) The micro-step drive system of the five-phase stepping motor is characterized in that when Io is a constant, a unit time interval is 1, a remainder obtained by a time variable divided by 10 is t and an arbitrary constant is $\alpha$ ($0 \leq \alpha < 10$), a winding for a salient-pole corresponding to a k-th phase (k=0, 1, 2, 3 and 4) is supplied with a winding current $I_k$ expressed by the following equation.

$I_k = f(t - 2k + \alpha)$
$f(t) = I_o$          $0 \leq t < 3$
$f(t) = I_o\{1 - (t - 3)\}$    $3 \leq t < 5$
$f(t) = -I_o$       $5 \leq t < 8$
$f(t) = I_o\{1 + (t - 8)\}$    $8 \leq t < 10$ This winding current $I_k$ can be attained by pulse width modulating an output of a constant-current converter generating a constant current by an output signal of a pulse width modulation pattern generator to supply this to the winding as an inverter output in an open loop.

Operation of the present invention is as follows.

When the number of teeth of a rotor of the five-phase stepping motor is $N_R$, $360°/N_R$ is named a basic angle in this specification. In the normal five-phase stepping motor, the rotor is rotated one basic angle by five steps. More particularly, there are a zeroth stable direction a first stable direction, ..., a fourth stable angle in one basis angle, and the rotor is moved to an adjacent stable direction for each step.

A salient-pole corresponding to a zeroth phase, a salient-pole corresponding to a first phase, ..., a salient-pole corresponding to a fourth phase of a stator of the five-phase stepping motor are disposed with the same symmetry as a regular pentagon and the winding currents of the salient-poles are supplied in five phases. Accordingly, the winding currents of the salient-poles corresponding to the respective phases are associated with the stable directions as follows.

Namely, when a phase angle $\phi$ of a point in which a vector (referred to as a torque vector in this specification) expressed by $I_0 \cdot u0 + I_1 \cdot u1 + \ldots + I_4 \cdot u4$ where vectors directing from the origin toward a p-th apex of the regular pentagon which is inscribed in a circle about the origin in an abstract plane are unit vectors u0, u1, u2, u3 and u4 and the winding currents of the respective phases are $I_0$, $I_1$, $I_2$, $I_3$ and $I_4$ intersects the circle is 360° (p/5) (p=0, 1, 2, 3 and 4), the rotor is positioned in the p-th stable direction (p=0, 1, 2, 3 and 4). For example, when $I_0 = 1$ and $I_1 = I_2 = I_3 = I_4 = 0$, $\phi = 0$ and accordingly the rotor is positioned in the zeroth stable direction. When $I_1 = 1$ and $I_0 = I_2 = I_3 = I_4$, $\phi = 360°$ (1/5) and accordingly the rotor is positioned in the first stable direction. As another example, when $I_0 = 1$, $I_1 = 0$, $I_2 = -1/2$, $I_3 = -1/2$ and $I_4 = 0$, $\phi = 0$, and when $I_1 = 1$, $I_2 = 0$, $I_3 = -1/2$, $I_4 = -1/2$ and $I_0 = 0$, $\phi = 360°$ (1/5).

In other words, when an argument $\phi$ of the torque vector A is expressed by arg ($\phi$ = arg A) and the winding currents for each of the phases are $I_0$, $I_1$, $I_2$, $I_3$ and $I_4$, p is given by the following equation and the rotor is directed to the p-th stable direction.

$$p = \frac{5}{360°} \arg(I_o \cdot u0 + I_1 \cdot u1 + I_2 \cdot u2 + I_3 \cdot u3 + I_4 \cdot u4)$$

Figure 3:
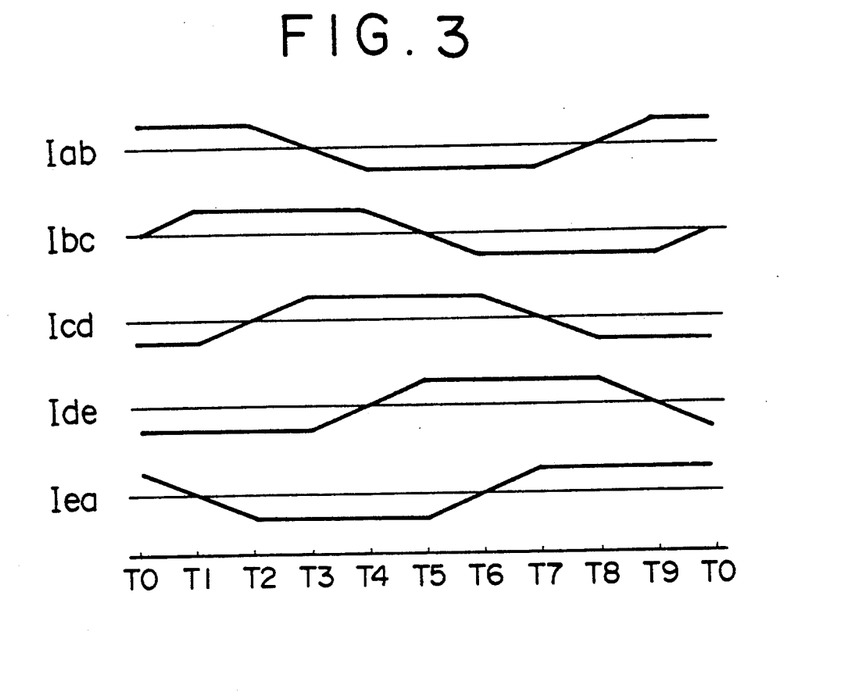
FIG. 3 is a timing chart showing variation of the phase currents in time of the micro-step drive system of the five-phase stepping motor according to the present invention.

The reason that the micro-step drive is achieved by a drive current of FIG. 3 is now described with reference to FIGS. 3, 4 and 5.

FIG. 3 shows variation of currents for each of the phases in the micro-step drive system of the five-phase stepping motor according to the present invention. In FIG. 3, the phase currents for the zeroth to fourth phases are expressed Iab, Ibc, Icd, Ide and Iea, time intervals $T_1-T_0$, $T_2-T_1$, ..., $T_9-T_8$, and $T_0-T_9$ are equal to the unit time interval 1, and $\alpha = 1$.

It is apparent from FIG. 3 that Iab+Ibc+Icd+Ide+Iea=0 is always satisfied. Namely, the currents are balanced.

Figure 5:
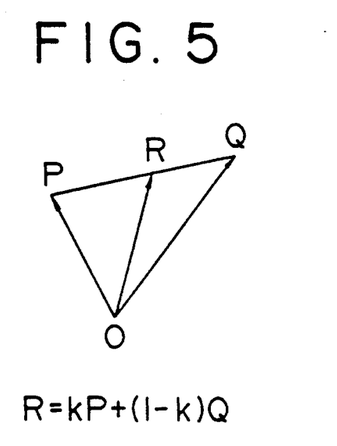
FIG. 5 is a diagram explaining one general characteristic of a vector.

FIG. 5 explains the general characteristic of a vector that, when there are two vectors P and Q, a locus of a vector R expressed by R=kP+(1−k)Q is moved from P to Q when k is varied from 0 to 1.

Figure 4:
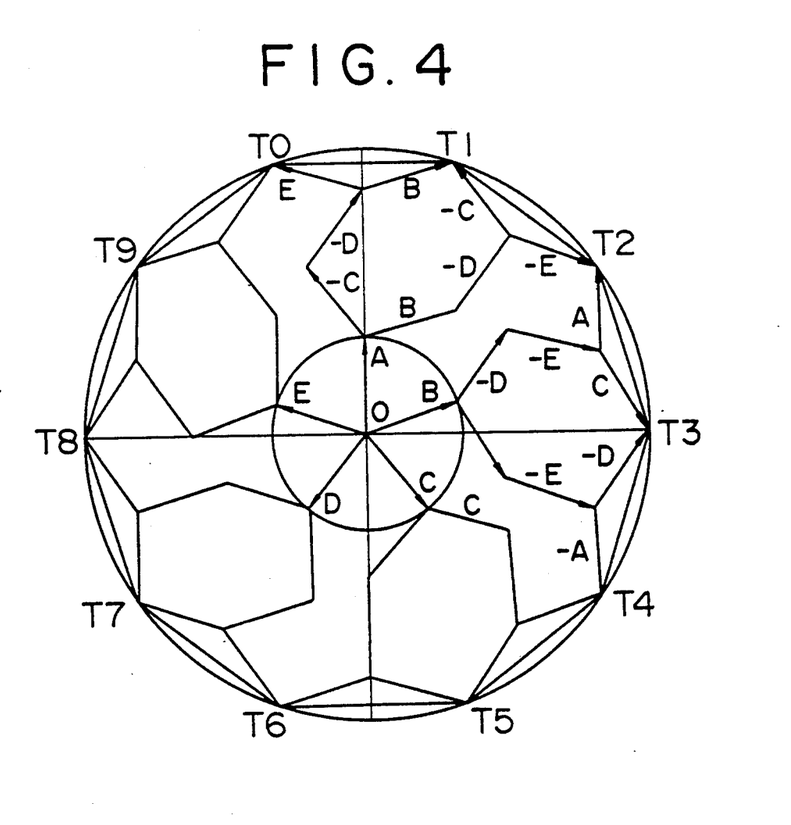
FIG. 4 is a diagram showing torque vectors corresponding to the phase current of FIG. 3.

FIG. 4 shows a locus of the torque vector IabA+IbcB+IcdC+IdeD+IeaE, which is a composition of torques corresponding to a set of the winding currents Iab, Ibc, Icd, Ide and Iea normalized by an amplitude $I_0$ of the phases when vectors A, B, C, D and E directing from the origin of a regular pentagon inscribed in a circuit about the origin 0 in the abstract plane to the p-th apex (p=0, 1, 2, 3 and 4) are unit vectors.

In the section $T_0-T_1$ of FIG. 3, Iab=1, Icd=−1, Ide=−1 and Ibc+Iea=1 and the state of Ibc=0 and Iea=1 at $T_0$ is linearly changed to the state of Ibc=1 and Iea=0 at $T_1$. Accordingly, in this section, the vector IabA+IbcB+IcdC+IdeD+IeaE is moved on a line connecting between the points $T_0$ and $T_1$. This is explained simply by application of the relation of FIG. 5 to Ibc and Iea.

In the section $T_1$-$T_2$, Iab=1, Ibc=1, Ide=−1 and Icd+Iea=−1 and the state of Icd=−1 and Iea=0 at $T_1$ is linearly changed to Icd=0 and Iea=−1 at $T_2$. Accordingly, in this section, the vector IabA+IbcB+IcdC+IdeD+IeaE is moved on a line connecting between the points $T_1$ and $T_2$ of FIG. 4.

When the same calculation is made for the sections $T_2$, $T_3$, ..., $T_9$ and $T_0$ of FIG. 3, the vector IabA+IbcB+IcdC+IdeD+IeaE is moved on a line connecting the points $T_2$, $T_3$, $T_4$, ... and $T_0$ of FIG. 4. It is understood from a simple calculation that the points $T_0$, $T_1$, ... $T_9$ and $T_0$ form the regular pentagon.

This means that the basic angle of the stepping motor is divided into ten steps. In other words, the micro-step drive in which the basic angle is divided into ten steps is achieved by the five-phase balanced current circuit.

According to the present invention, the circuit configuration of a power stage of the micro-step drive system can be greatly simplified.

(2) The micro-step drive system of the five-phase stepping motor including phase windings connected in a ring or star and a multi-phase inverter having an output stage of which one arm is constituted of a pair of switching elements for each phase, the switching elements being turned on and off to flow the phase currents through the phase winding characterized by the provision of a current controller for controlling the multi-phase inverter so that the current flowing through the phase winding is identical with a command value.

According to the present invention, the circuit configuration of the power stage of the drive system can be greatly simplified.

DETAILED DESCRIPTION OF PREFERRED EMBODIMENTS

Embodiments of the present invention is now be described in detail with reference to drawings.

First Embodiment

Figure 1:
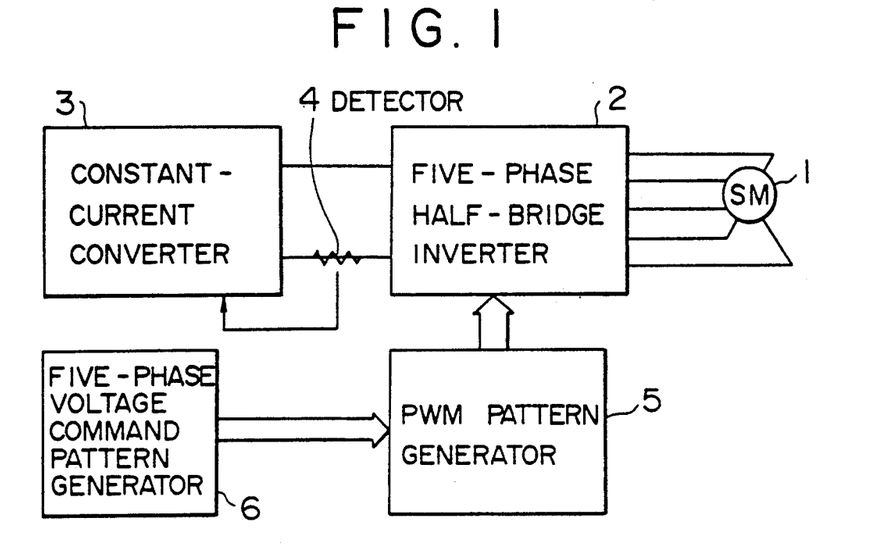
FIG. 1 is a block diagram showing a first embodiment of a micro-step drive system of a five-phase stepping motor according to the present invention.

FIG. 1 is a block diagram showing an embodiment of a micro-step drive system of a five-phase stepping motor according to the present invention.

In FIG. 1, reference numeral 1 denotes a hybrid type five-phase stepping motor, 2 a five-phase half-bridge inverter connected to phase windings of the stepping motor 1, 3 a constant-current converter which detects a current flowing through the inverter 2 by a detector 4 to supply a constant current to the inverter 2, and 5 a pulse width modulation pattern generator which supplies a gate signal to the inverter 2 in the PWM (pulse width modulation) method in response to an output signal from a five-phase voltage command pattern generator 6.

Figure 2:
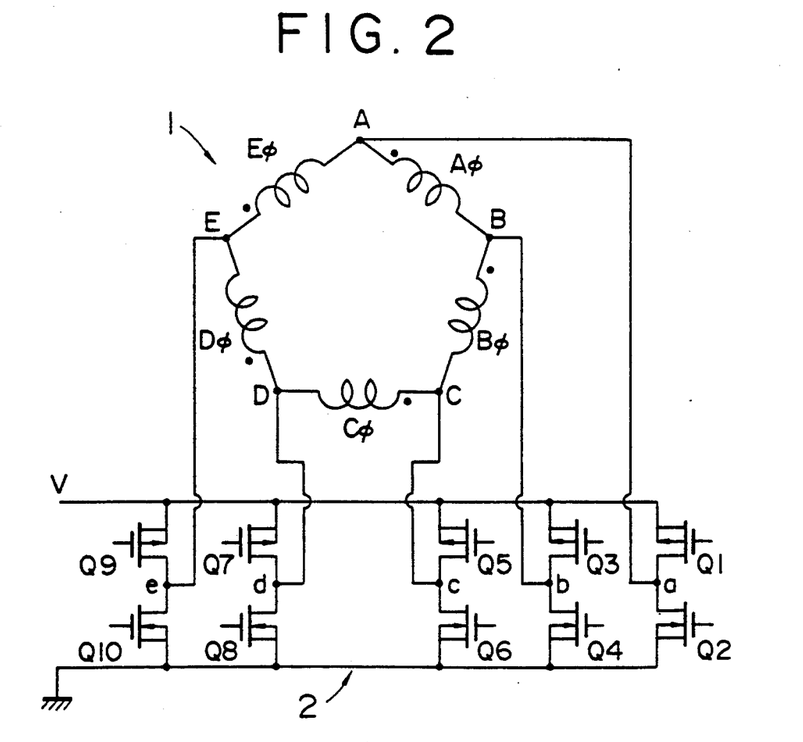
FIG. 2 is a circuit diagram of phase windings of the five-phase stepping motor 1 connected into a ring by the pentagon connection and a five-phase half-bridge inverter circuit.

FIG. 2 is a circuit diagram of phase windings $A\phi$, ..., $E\phi$ of the five-phase stepping motor 1 connected into a ring by the pentagon connection and the five-phase half-bridge inverter 2, in which junctions A, ..., E of the phase windings $A\phi$, ... $E\phi$ are connected to junctions a, ..., e between pairs of switching elements $Q_1$ and $Q_2$, $Q_3$ and $Q_4$, $Q_5$ and $Q_6$, $Q_7$ and $Q_8$, and $Q_9$ and $Q_{10}$, respectively.

A control method of the five-phase stepping motor according to the present invention is now described.

In order to make currents flowing through each of the phase windings of the five-phase stepping motor 1 to be balanced currents, it is necessary to make the micro-step drive by using the phase current waveforms of FIG. 3. In this case, a value of current flowing out of the inverter 2 and a value of current flowing into the inverter 2 are constant because of the balanced currents.

Accordingly, if the current flowing into the inverter 2 is controlled to be constant, a total of the drive currents can be constant irrespective of the rotational number of the motor 1.

Thus, in order to control the phase currents to have the phase current waveforms of FIG. 3, current distribution is made by an open loop.

Figure 6:
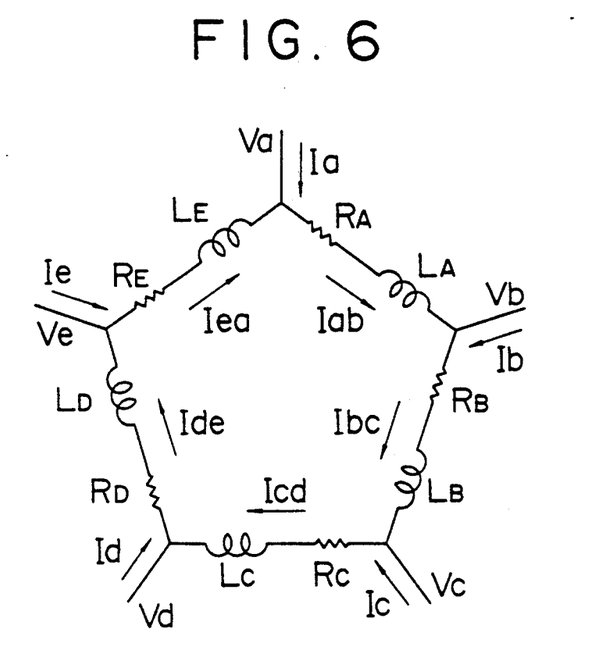
FIG. 6 is an equivalent circuit of the five-phase stepping motor connected into a pentagon.

FIG. 6 is an equivalent circuit of the five-phase stepping motor connected into a pentagon.

A command to the inverter 2 for making the current distribution by the open loop is given by a voltage for a target current value.

The command voltages are calculated as follows.

When line voltages, line currents and phase currents are defined as shown in FIG. 6, the following relation is obtained.

$$Iab + Ibc + Icd + Ide + Iea = 0 \quad (1)$$

In the steady state, when there is no influence of inductances and counter electromotive forces and no variation in resistance values of the phases, the following relation is obtained.

$$Va - Vb = Iab \times R$$
$$Vb - Vc = Ibc \times R$$
$$Vc - Vd = Icd \times R$$
$$Vd - Ve = Ide \times R$$
$$Ve - Va = Iea \times R$$
(2)

$$R_A + R_B + R_C + R_D + R_E = R \quad (3)$$

Figure 7:
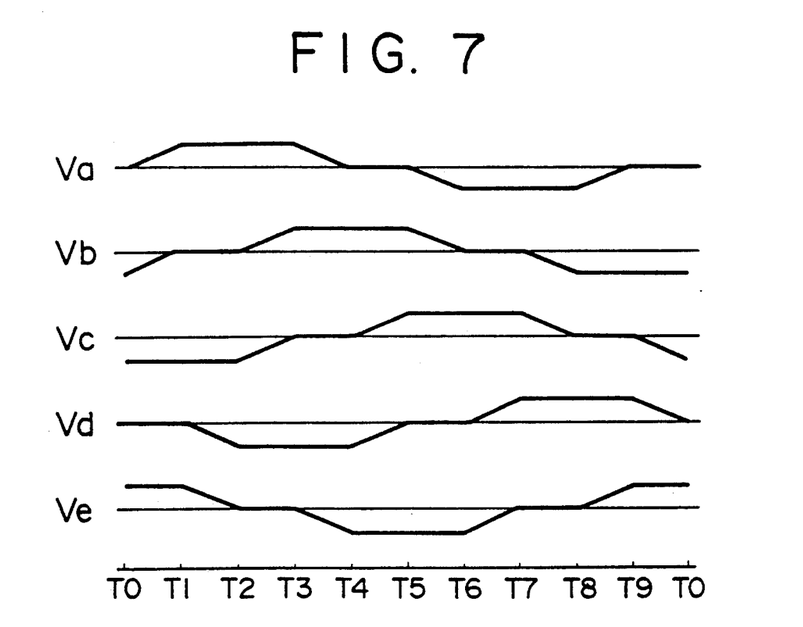
FIG. 7 is a timing chart showing variation of command voltage signals in time.

FIG. 7 is a diagram showing signal waveforms of command voltages in the case where command voltages Va, Vb, Vc, Vd and Ve for supplying the winding currents Iab, Ibc, Icd, Ide and Iea of FIG. 3 are obtained by using the equations (1), (2) and (3).

Figure 8:
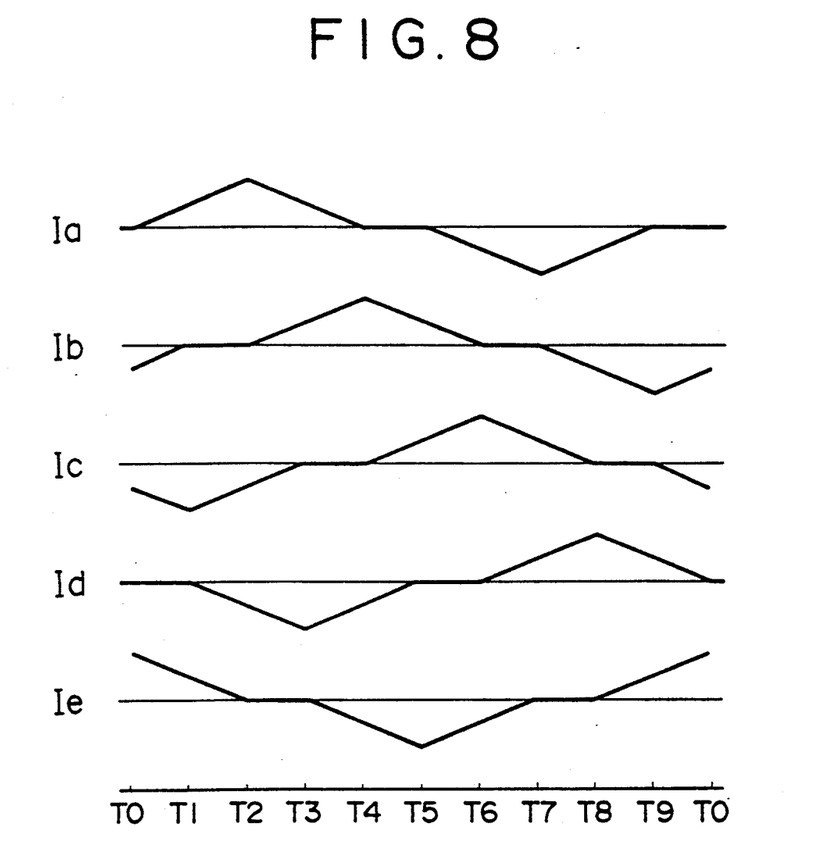
FIG. 8 is a timing chart showing variation of currents in time entering junctions of the windings of FIG. 6.

FIG. 8 shows currents Ia, Ib, Ic, Id and Ie flowing into the junctions of the windings of FIG. 6 in time. In FIG. 8, Ia=Iab−Iea, Ib=Ibc−Iab, Ic=Icd−Ibc, Id=Ide−Icd, and Ie=Iea−Ide.

The command voltage signals of FIG. 7 are generated by the five-phase voltage command pattern generator 6 of FIG. 1 and modulation pattern is generated by the pulse width modulation pattern generator 5 on the basis of the command voltage signals. The constant current from the constant current converter 3 is pulse width modulated on the basis of the modulation pattern so that the currents Ia, Ib, Ic, Id and Ie of FIG. 8 are supplied to the junctions of the windings.

The above description is made to the five-phase stepping motor having the phase windings connected into the pentagon or ring in detail, while the five-stepping motor having the phase windings connected into a star can be also operated similarly.

As described above, the micro-step drive system of the five-phase stepping motor according to the present invention possesses the following effects.

The number of the switching elements of the inverter can be reduced from 20 to 10 and the power circuit can be simplified greatly.

Although 10 connecting lines are heretofore required to connect the motor to the inverter, the number of the connecting lines can be reduced to a half or five lines and the number of IC's and errors of the connection can be reduced.

Heretofore, current detectors are required for each phase in the micro-step drive of the phase current control system and the circuit configuration is large and complicated. However, in the present invention, since the phase currents are controlled by the open loop, the circuit is simplified without the current detector.

The current control can be performed by the pulse width modulation of the voltage command in the open loop which is suitable for the digital control essentially, and the control circuit can be simplified.

Second Embodiment

Figure 9:
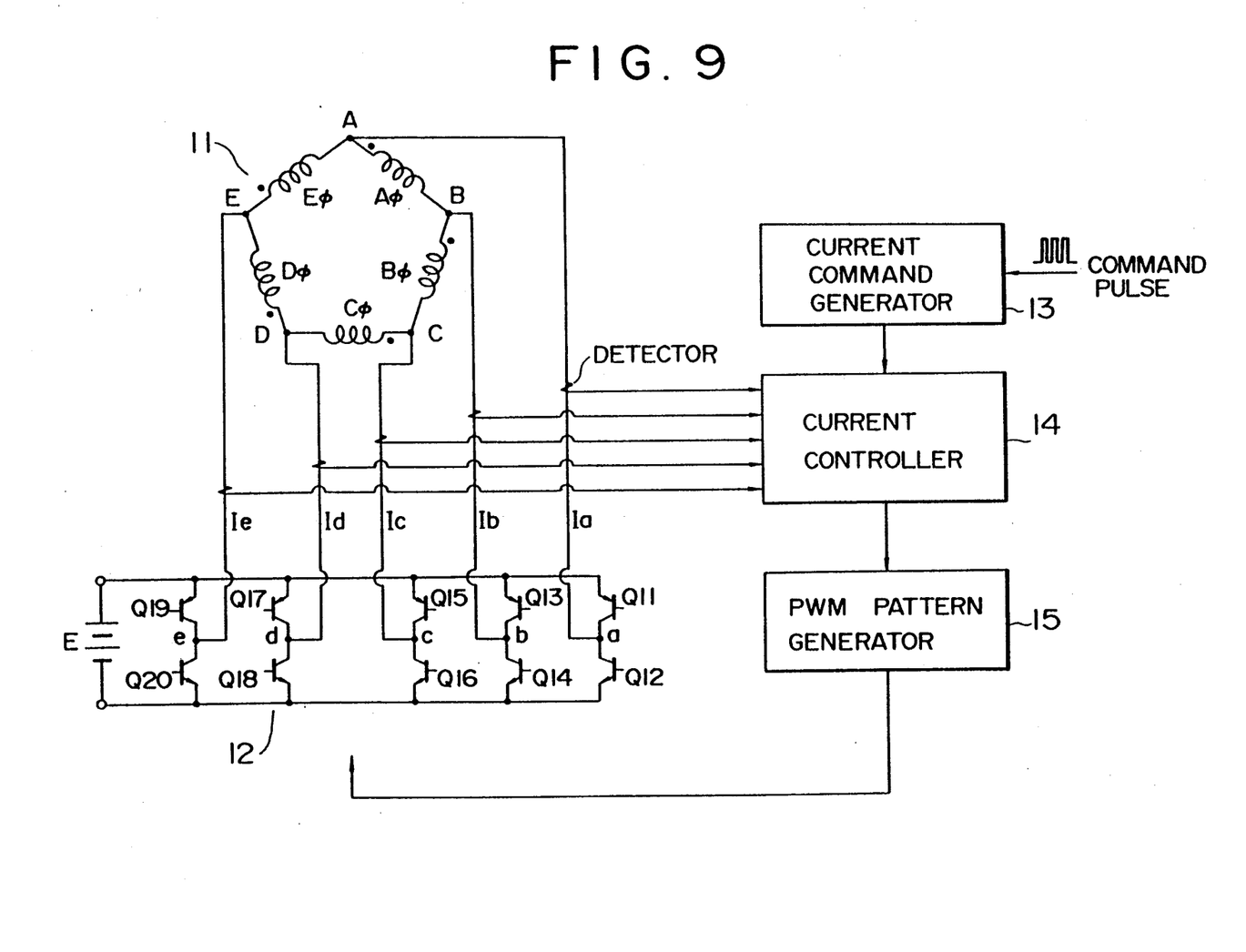
FIG. 9 is a block diagram showing a second embodiment of a micro-step drive system of a five-phase stepping motor according to the present invention.
Figure 10:
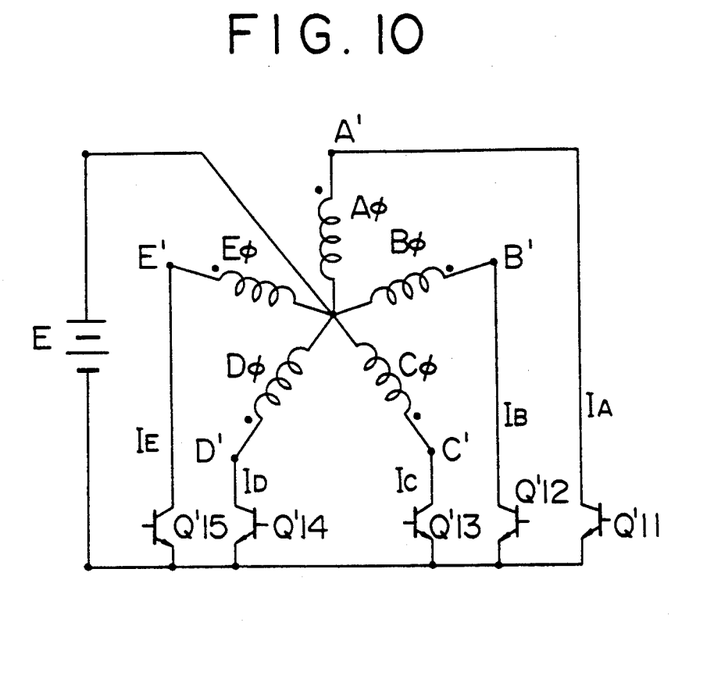
FIG. 10 is a circuit diagram showing a drive circuit where the phase windings of the stepping motor are connected into a star.

In FIG. 9, reference numeral 11 denotes a hybrid type five-phase stepping motor having phase windings connected into a ring, and 12 a five-phase half-bridge inverter connected to the phase winding of the five-phase stepping motor 11. The inverter 12 includes five pairs of series-connected transistors $Q_{11}$ to $Q_{20}$ and the five pairs of transistors are connected in parallel with each other and to a common dc power source E. Junctions a ... e between the pairs of switching elements $Q_{11}$ and $Q_{12}$, $Q_{13}$ and $Q_{14}$, $Q_{15}$ and $Q_{16}$, $Q_{17}$ and $Q_{18}$, and $Q_{19}$ and $Q_{20}$ are connected to junctions A ... E of phase windings $A\phi$ ... $E\phi$ for the pentagon connection, respectively, while the junctions a ... e are connected to junctions A' ... E' of the phase windings $A\phi$ ... $E\phi$ for the star connection of FIG. 10, respectively. Reference numeral 13 denotes a current command generator which generates a predetermined command value in response to a command pulse, 14 a current controller which detects currents Ia ... Ie supplied to the phase windings $A\phi$ ... $E\phi$ and compares the currents with the command value from the current command generator 13, and 15 a PWM (Pulse Width Modulation) pattern generator which generates gate pulses to the switching elements $Q_{11}$ ... $Q_{20}$ of the inverter 12 in response to a signal from the current controller 14.

The command values Ia ... Ie of the phase currents are, as shown in FIG. 8 in the case of the five-phase ring connection, distorted wave alternating current signals in the form of a triangular wave with a phase difference of $2\pi/5$. When one period of the current waveform of the command value for an arbitrary phase is divided equally into ten sections and 1 represents a predetermined value, the current waveform of the command value increases monotonously or linearly from 0 to 1 for the first two sections of the one period and then reduces from 1 to 0 monotonously or linearly for the next two sections. For the next one section, the waveform is zero, that is, zero command. Further, the waveform increases monotonously or linearly from 0 to −1 for the next two sections and reduces monotonously or linearly from −1 to 0 for the next two sections. For the last one section, the waveform is zero command. The sum total of each of the phase currents is zero.

Figure 11:
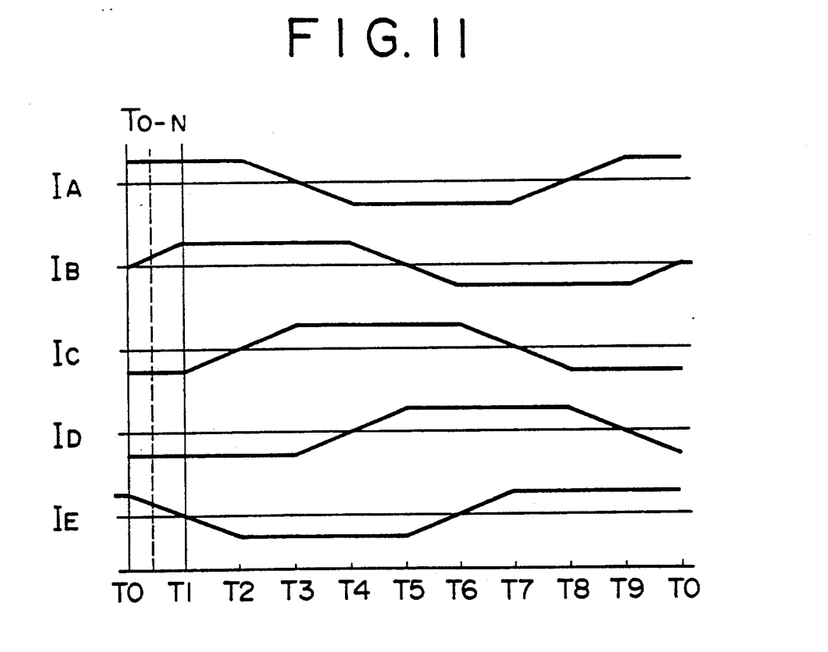
FIG. 11 is a diagram showing waveforms of current commands in the case where the phase windings of the stepping motor are connected into a star.

The command values $I_A$ ... $I_E$ of the phase currents are, as shown in FIG. 11 in the case of the star connection, distorted wave alternating current signals in the form of a trapezoidal wave with a phase difference of $2\pi/5$. When one period of the current waveform of the command value for an arbitrary phase is divided equally into ten sections and 1 represents a predetermined value, the current waveform of the command value increases monotonously or linearly from −1 to 1 for the first two sections of the one period and then maintains 1 for the next three sections. Further, the waveform reduces from 1 to −1 monotonously or linearly for the next two sections. For the last three sections, the waveform maintains −1. The sum total of each of the phase currents is zero.

Operation of the embodiment is now described.

Equations of torques for each of the phase of the five-phase stepping motor are given by $$T_A = I_A K_T \sin\theta$$
$$T_B = I_B K_T \sin(\theta - 2\pi/5)$$
$$T_C = I_C K_T \sin(\theta - 4\pi/5)$$
$$T_D = I_D K_T \sin(\theta - 6\pi/5)$$
$$T_E = I_E K_T \sin(\theta - 8\pi/5)$$
(1)

where $K_T$ is a constant.

Figure 12:
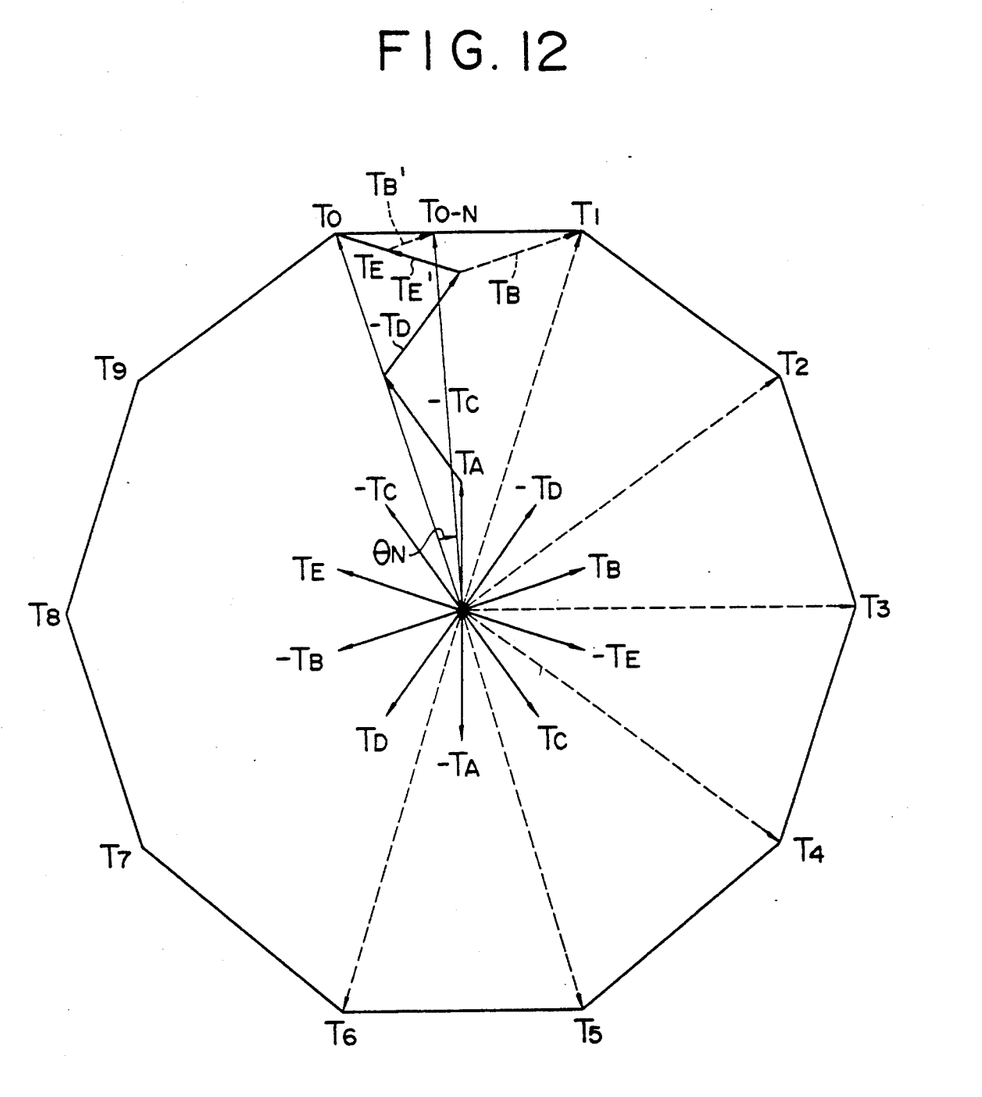
FIG. 12 is a torque vector diagram in the case where the phase windings are driven by a constant current.
Figure 13:
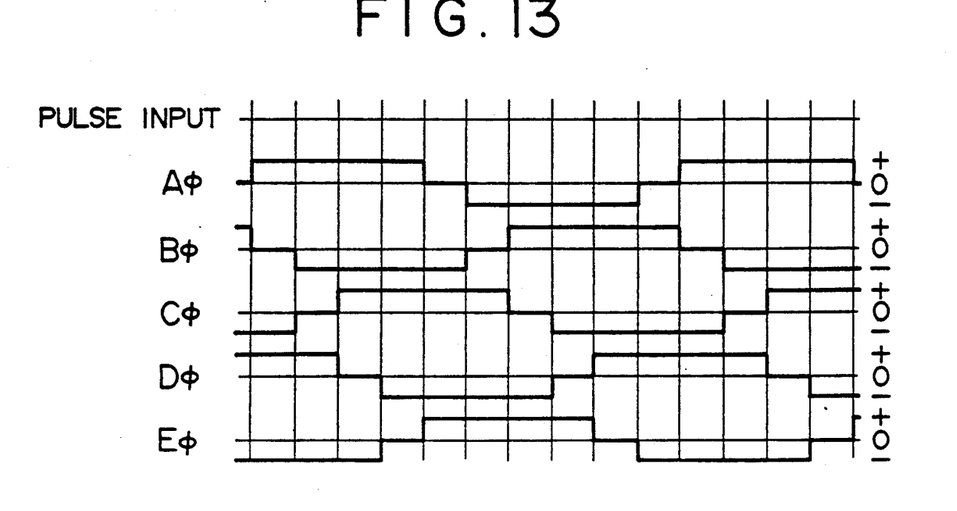
FIG. 13 is a diagram showing a waveforms of excitation sequence.

A composite value of the phase torque produced by the currents $I_A$ to $I_E$ flowing through the phases is a total torque. The torque vector in the case where the phases are driven by a constant current is shown by $T_0$–$T_{10}$ of FIG. 12. (FIG. 12 shows four-phase excitation.) The excitation sequence at this time is shown in FIG. 13. In this state, the half-step angle equal to a half of the basic step angle is merely attained by the five-phase excitation and the resolution can not be improved. It is considered that the current is controlled to produce a vector $T_{0-N}$.

$T_0$ is a vector produced as $I_A=i$, $I_c=-i$, $I_d=-i$, $I_E=i$ and $i_B=0$ and $T_1$ is a vector produced by setting $I_E=0$ and $I_B=i$ from the state $T_0$. The vector of $T_{0-N}$ can be stopped at a step angel $\theta_N$ from $T_0$ when $I_E$ is reduced from i monotonously or linearly to be a vector of $T_E \to T'_E$ in FIG. 12 and $I_B$ is increased monotonously or linearly so that $T_B$ produces $T'_B$ vector and is stopped at a current value producing $T_{0-N}$ vector by controlling the magnitude of $I_B$ and $I_E$. Namely, the command current value is divided equally into M portions and $I_E$ and $I_B$ are divided equally into M portions each time an input pulse is supplied with $I_E$ and $I_B$ being reduced and increased monotonously or linearly respectively so that the portion between $T_0$ and $T_1$ can be divided equally into M portions. In this manner, the waveforms of the currents flowing through the phases are as shown in FIG. 11. The current waveform is a balanced multiphase alternating current and can be controlled by a half-bridge inverter. In the case of the star connection shown in FIG. 10, an output current of the inverter is coincident with the phase current obtained above and the current waveforms of FIG. 11 are set to command waveforms as they are so that the micro-step drive can be attained.

In the pentagon connection shown in FIG. 9, the phase current is not coincident with the current waveform of the inverter and the command current waveform is required to be the triangular current command values shown in FIG. 8 in order to supply the phase currents of FIG. 11.

As described above, the micro-step drive apparatus of the five-phase stepping motor according to the present invention possesses the following effects.

The conventional micro-step drive of the five-phase stepping motor requires 20 expensive power switching elements, whereas in the present invention the number of the power switching elements are reduced to a half or 10 and the circuit is greatly simplified even if gate circuits for the power elements are included.

Particularly, the micro-step drive requires the high-speed switching and often employs FET's (field effect transistors) as the power elements. In this case, it is generally necessary to electrically insulate positive side elements from gates and accordingly reduction of the power elements is very effective. Further, the half-bridge inverter requires only five outputs and can simplify the connection. The operation can be greatly simplified and error of connection can be also greatly prevented as compared with the conventional micro-step drive requiring 10 wirings.

I claim.

1. A micro-step drive system for a five-phase stepping motor having five-phase windings and salient poles, comprising:
    means for applying a current to each of the five-phase windings;
    pattern generating means coupled to said current supplying means for causing said current supplying means to supply each of said windings with a current $I_k$ having a waveform expressed by $$I_k = f(t - 2k + a)$$

-continued $f(t) = I_o$                  $0 \leq t \leq 3$ $f(t) = I_o \{1 - (t - 3)\}$    $3 \leq t \leq 5$ $f(t) = -I_o$               $5 \leq t \leq 8$ $f(t) = I_o \{1 + (t - 8)\}$    $8 \leq t \leq 10$ where:
k=0, 1, 2, 3, and 4 and represents the phases of the windings,
$I_o$ is the value of a selected constant current,
t is one tenth of a time variable,
a is a constant ($0 \leq a \leq 10$).

2. A micro-step drive system of a five-phase stepping motor according to claim 1, wherein said means for applying a current includes a five-phase inverter circuit for supplying a phase current to each of the phase windings of the motor, and a control circuit for controlling an output current of the five-phase inverter circuit with pulse width modulation so that the phase currents flowing through the phase winding is equal to the current having the waveform.

3. A micro-step drive system of a five-phase stepping motor according to claim 1, wherein the phase windings of the five-phase stepping motor are connected in a ring.

4. A micro-step drive system of a five-phase stepping motor according to claim 1, wherein the phase windings of the five-phase stepping motor are connected in a star.

5. A micro-step drive system of a five-phase stepping motor having phase windings connected in a ring, including a multi-phase inverter having switching elements each forming an arm for each phase, the switching elements being turned on and off to supply a phase current to each of the phase windings, characterized by a current controller for controlling the multi-phase inverter so that a current flowing through each of the phase windings is coincident with a command value, and the command value of the phase windings is an alternating current signal in the form of a triangular wave with a phase difference of $2\pi/5$.

6. A micro-step drive system of a five-phase stepping motor according to claim 5, wherein one period of the current waveform of the command value for an phase is divided equally into ten sections and represents a predetermined value, the command value is increased monotonously or linearly from 0 to 1 for first two sections and is reduced from 1 to 0 monotonously or linearly for next two sections, with the command value being zero command for next one section, the command value being increased monotonously or linearly from 0 to 1 for next two sections and reduced monotonously or linearly from $-1$ to 0 for next two sections, the command value being zero for last one section and the sum total of each of the phase currents being zero.

7. A micro-step drive system of a five-phase stepping motor having phase windings connected in a star, including a multi-phase inverter having switching elements each forming an arm for each phase, the switching elements being turned on and off to supply a phase current to each of the phase windings, characterized by a current controller for controlling the multi-phase inverter so that a current flowing through each of the phase windings is coincident with a command value and the command value of the phase windings is an alternating current signal in the form of a trapezoidal wave with a phase difference of $2\pi/5$.

8. A micro-step drive system of a five-phase stepping motor according to claim 7, wherein one period of the current waveform of the command value for an arbitrary phase is divided equally into ten sections and represents a predetermined value, the command value is increased monotonously or linearly from −1 to 1 for two sections and is maintained 1 for the next three sections, with the command value being reduced from 1 to −1 monotonously or linearly for the next two sections and the command value being −1 for the last three sections and the sum total of each of the phase currents being 0.

* * * * *